US011619715B2

(12) United States Patent
Keller et al.

(10) Patent No.: US 11,619,715 B2
(45) Date of Patent: Apr. 4, 2023

(54) METHOD AND DEVICE FOR OPTIMIZING THE USE OF EMITTER AND DETECTOR IN AN ACTIVE REMOTE SENSING APPLICATION

(71) Applicant: FASTREE3D SA, Ecublens (CH)

(72) Inventors: Stefan Thomas Keller, Le Mont-sur-Lausanne (CH); Bruno Penlae, Lausanne (CH)

(73) Assignee: FASTREE3D SA, Ecublens (CH)

( * ) Notice: Subject to any disclaimer, the term of this patent is extended or adjusted under 35 U.S.C. 154(b) by 774 days.

(21) Appl. No.: 16/493,008

(22) PCT Filed: Mar. 16, 2017

(86) PCT No.: PCT/EP2017/056323
§ 371 (c)(1),
(2) Date: Sep. 11, 2019

(87) PCT Pub. No.: WO2018/166611
PCT Pub. Date: Sep. 20, 2018

(65) Prior Publication Data
US 2020/0116825 A1    Apr. 16, 2020

(51) Int. Cl.
*G01S 7/484* (2006.01)
*G01S 7/48* (2006.01)
*G01S 7/486* (2020.01)

(52) U.S. Cl.
CPC ............ *G01S 7/484* (2013.01); *G01S 7/4808* (2013.01); *G01S 7/4868* (2013.01)

(58) Field of Classification Search
CPC ...... G01S 7/484; G01S 7/4808; G01S 7/4868; G01S 7/48
See application file for complete search history.

(56) References Cited

U.S. PATENT DOCUMENTS

| 5,241,315 A | 8/1993 | Spinhirne |
| 6,744,470 B1 | 6/2004 | Kalshoven, Jr. et al. |
| 6,826,204 B2 | 11/2004 | Kennedy et al. |

(Continued)

FOREIGN PATENT DOCUMENTS

| EP | 2587276 A1 | 5/2013 |
| WO | 20100020755 A2 | 2/2010 |
| WO | 2015004213 A1 | 1/2015 |

*Primary Examiner* — Seung C Sohn
(74) *Attorney, Agent, or Firm* — Browdy and Neimark, PLLC

(57) ABSTRACT

The invention relates to a method of an optimal arrangement in time of a laser emitter and a detector for a remote sensing application, comprising: —setting a target time unit integration time $t_p$; —translating said time unit integration time into a reduced time $\tau_p$ and its corresponding power increase factor $\eta^{-1}$; —activating both the laser emitter, with a power output corrected by $\eta^{-1}$, and the detector for a duration of $\tau_p$; —deactivating the emitter and detector after duration $\tau_p$; —keep emitter and detector off for the subsequent duration $t_{off}=t_p-\tau_p$. The invention further relates to a device implementing said method.

24 Claims, 6 Drawing Sheets

(56) References Cited

U.S. PATENT DOCUMENTS

| | | | |
|---|---|---|---|
| 7,209,221 B2 * | 4/2007 | Breed | B60N 2/0232 |
| | | | 356/28 |
| 7,583,364 B1 | 9/2009 | Mayor et al. | |
| 7,809,182 B2 | 10/2010 | Kirschner | |
| 8,203,698 B2 * | 6/2012 | Meyers | G01S 7/497 |
| | | | 356/5.1 |
| 8,724,097 B2 | 5/2014 | Pohl et al. | |
| 8,736,818 B2 * | 5/2014 | Weimer | G01S 17/89 |
| | | | 250/208.2 |
| 10,031,232 B2 * | 7/2018 | Zohar | G01S 7/4814 |
| 2008/0297360 A1 | 12/2008 | Knox et al. | |
| 2013/0235203 A1 | 9/2013 | Billington et al. | |
| 2015/0340390 A1 | 11/2015 | Wall et al. | |
| 2015/0364635 A1 | 12/2015 | Bodlovic et al. | |

* cited by examiner

METHOD AND DEVICE FOR OPTIMIZING THE USE OF EMITTER AND DETECTOR IN AN ACTIVE REMOTE SENSING APPLICATION

TECHNICAL FIELD

The present invention relates to a method and a device for optimizing the use of emitter and detector in an active remote sensing application. More specifically, the present invention optimizes said use of emitter and detector with regard to eye-safety of the used laser emitter, the signal to background ratio in the detection, and the power consumption of the detector.

PRIOR ART

Remote sensing refers to a method to acquire information about certain properties of a target under investigation, without being in physical contact with said target. There are active and passive methods.

Passive methods could for example involve to analyze satellite photographs, and to infer on the topography of the landscape from said photographs, or to deduce the electricity use of a certain region based on the light pollution captured in night photographs. These examples are of passive nature as the satellite doesn't actively irradiate the target. Instead, it uses the light emitted by third party contributors, namely the sun and artificial lighting from, for example, cities.

In active remote sensing applications the sensing device actively irradiates the target under investigation, as it acquires the information. Flash photography is one example. More general, active remote sensing is typically referred to under the name radar (RAdio Detection And Ranging), lidar (Light Detection And Ranging), or sonar (SOund Navigation And Ranging), depending on whether the irradiation is of electromagnetic (radio wave or light) or acoustic nature, respectively.

Devices used for remote sensing typically face challenges posed by environmental conditions, technical limitations, and juristic regulations. Environmental challenges could be, for example, temperature or sun irradiation. Technical limitations could be related to the physical maximum transmission or minimum detection power. Juristic regulations could for example restrict the power of the transmitted radiation. Improving a remote sensing device means to optimize its performance within the boundaries given by these challenges.

An active remote sensing application typically has a signal transmitter, a receiver, and a processing unit. The processing unit on the one hand controls both transmitter and receiver. On the other hand, the processing unit evaluates the data relayed from the receiver. Of said relayed data, a part is correlated with the transmitted signal. The rest of said relayed data represent noise or background contributions. These contributions are not correlated with the signal, but originate from the environment and/or the receiver itself. The signal contributions are typically outnumbered by the noise and background contributions.

The performance of a remote sensing application is thus given by its ability to filter out the signal contributions among the noise and background. In order to enhance this performance there are typically two possibilities. First, the power of the signal transmission can be increased. The more signal contributions there are among the noise and background contributions, the easier it is to filter out the relevant data. Second, each receiver comes with a certain threshold of noise equivalent power. Below this threshold the signal contributions cannot be distinguished from the noise and background contributions typically brought in by the receiver itself. Hence, beside an increase in signal transmission, one can increase the sensitivity of the receiver; typically by selecting and/or discarding a certain type when choosing a receiver.

The sensitivity of the receiver is ultimately limited by the laws of physics. For example, if one works with light, if the remote sensing application uses a receiver sensitive to single photons, this sensitivity cannot be improved much further. Respectively, different single photon detectors show different photon detection probabilities. But the difference between one another remains in the percentage of quantum efficiency. Such receivers could be (Geiger mode) avalanche photo diodes (APDs), silicon photo multipliers (SiPMs), or single-photon avalanche diodes (SPADs).

Likewise, the emitted power cannot be increased at will either. Thereby, the emission maximum is hardly in question.

Document U.S. Pat. No. 6,826,204, for example, discloses a method to use a laser with low duty-cycle in order to reach increased pulse peak power with respect to the continuous wave emission power. However, such lasers are intended for material processing. A laser used for remote sensing is typically limited to much lower limits: they're typically purposed to be used among humans, who in many use cases aren't equipped with personal safety accessories. For such purposes eye-safety limits restrict the emitted power typically much earlier than the technical ones.

In terms of laser eye-safety, an overview of a few concepts is given first; throughout the rest of the present disclosure we refer in several occasions to these concepts. A person skilled in the art is aware about the eye-safety related concepts imposed for laser emission. Therefore the overview is restricted to only those aspects considered as relevant for the present invention, and that is part of the relevant prior art. We stick primarily to the notations used by the international standard IEC 60825-1:2014, "Safety of laser products—Part 1: Equipment classification and requirements," Edition 3, 2014. However, the American National Standard for Safe Use of Lasers, ANSI Z136.1, and the ICNIRP (International Commission on Non-Ionizing Radiation Protection) guidelines on exposure limits published in Health Phys. 105(3), 2013, doi:10.1097/HP.0b013e3182983fd4 are equivalent, as for example explained in B. J. Lund and K. Schulmeister, "On the exposure limits for extended source multiple pulse laser exposures," J. of Laser Appl. 25(4), 2013, doi:10.2351/1.4802761. For convenience, in FIG. 1, the differences in symbol notation between these three publications is listed. This way people used to either of the notations can easily follow the present description.

According to laser eye-safety, emission with wavelength 400 nm$<\lambda\leq$700 nm is considered visible. For visible emission the human eye has a natural aversion mechanism: the eye lid closes. Because of this blink-reflex some visible lasers benefit from a relaxed certification, during which the maximum exposure duration is limited to 0.25 s. The wavelength range between 700 nm$<\lambda\leq$1400 nm is considered invisible, but the eye is still transparent for such radiation. Consequentially, the range 400 nm$<\lambda\leq$1400 nm is called the retinal hazard region: emission within this spectral range can reach the retina, and by means of the eye's lens can be focused onto a small spot. Radiation corresponding to $\lambda>$1400 nm is also invisible. However, since light corresponding to these wavelengths is absorbed already at the eye's cornea, before entering the eye. Therefore, what determines the laser class is the power density present at the cornea; no additional focusing effect needs to be accounted for. This can lead to a permitted exposure limit orders of magnitude higher than the limit given for the retinal hazard region.

Beside wavelength, the exposure duration plays a key role in examining eye-safety. The allowed peak power tends to increase as the exposure duration is reduced. Usually, the exposure duration is set equal to the emitted pulse duration. If a source doesn't emit pulses but in continuous wave instead, this emission can be seen as pulsed with pulse duration equal to the extreme value $T_2$, which takes into account involuntary eye movements, so that different sites in the eye are considered to be exposed. Continuous wave emitting scanning devices—which emit in different directions over time—can in some cases be interpreted as pulsed emitters with the pulse duration equal to the time the displacing beam needs to cross the eye.

The retinal hazard region furthermore knows a parameter that takes into account the apparent size of the laser source. The eye can be seen as an imaging apparatus which images the apparent source onto the retina. The light entering the eye is thus concentrated within the area of said image. The larger this image, the larger is also the allowed emission limit of the source. The image size depends on the distance from the source. This is why the source size is accounted for not by its physical dimensions, but by its subtended angle. For example, a source of x=1 cm diameter, seen at a distance of R=10 cm subtends an angle of about $x/R=\alpha=100$ mrad. The same source seen from a distance of R=1 m creates a much smaller image $\alpha=10$ mrad.

For a safety analysis one has to always consider the most hazardous and/or restrictive position, which often means a situation such that the subtended angle is smallest. The smallest angle that needs to be accounted for is $\alpha_{min}=1.5$ mrad, the eye cannot create images smaller than the equivalence of this. Sources with $\alpha \leq \alpha_{min}$ are called small sources. Sources with $\alpha > \alpha_{min}$ are called large and/or extended sources. Collimated lasers typically need to be considered as small sources: even if the source is extended from close by, since the power density in a collimated beam doesn't diminish over distance, larger distances result in equal accessible power with smaller subtended angles, and thus represent a more hazardous situation. On the other hand, a large diameter collimated beam—with a diameter larger than the eye's pupil—can be beneficial for eye-safety as only a fraction of the emission can enter the eye.

It is important to stress that the apparent source is not necessarily the source of the original emission. It can be, for example, a virtual image of the original source, or the emission from a diffuser, or in some cases it can be the beam waist of a focused beam. Finding the exact place and size of the apparent source can be difficult and is beyond the scope of the present invention. An overview is for example given in K. Schulmeister, "'The Apparent Source'—A Multiple Misnomer," ILSC conference proceedings, p. 91-98, 2005.

In literature, several attempts are known which try to increase or circumvent the limit of the allowed emission power mainly by working with wavelength and/or exposure duration.

In Mayor et al. U.S. Pat. No. 7,583,364, the explained spectral response of the eye is exploited to operate a powerful eye-safe lidar at $\lambda=1.5–1.8$ µm.

In Pohl et al. U.S. Pat. No. 8,724,097, two overlapping lasers, one invisible and one visible are used. The visible laser is supposed to induce the aforementioned blink-reflex in order to increase the safety level for the emission of the invisible source. Such a system has the disadvantage that the allowed emission limit of the two sources combined need to be below the regulated limit, such that the eventual power increase is rather low. Besides, such a system would need additional safety features to ensure the invisible light doesn't emit if the visible source is out of order, for example; which adds cost and complexity.

In Harris et al. WO2010020755, a collimated laser beam is used in a lidar, whose emission angle is changed from time to time. For the lidar acquisition the change in angle is irrelevant, in their case. But by exposing different sites (e.g. of the eye) the average exposure power is reduced, so that they claim increased eye-safety. As they note, for this decrease in average power exposure to potentially increase eye-safety, the beam displacement has to be in the order of the beam diameter. This implies either the emission angle has to change by a large amount, or there are means installed to prohibit humans to enter a zone too close to the source. In many applications these trade-offs are not realistic.

Such external safety mechanisms are for example used in Billington et al. US20130235203 in order to employ strong lasers to illuminate a scene. The safety mechanism in their case is a proximity detector adapted to turn off the laser upon detecting something within a pre-determined distance.

In Spinhirne U.S. Pat. No. 5,241,315, the blink reflex applicable for visible lasers, which helps with their eye-safety concerns, is also mentioned. The main technique to increase eye-safety, however, is to expand the diameter of their collimated beam. A large diameter collimated beam requires a condenser lens of at least the same diameter, which leads to a large and bulky over-all system. A Geiger mode Avalanche Photo Diode (GAPD) is mentioned as receiver.

Beside the strategies highlighted in the prior art, a mere increase in sensitivity or emission power is often not feasible. Instead, one needs to use the receiver and/or transmitter more efficiently. As already mentioned, the received radiation typically contains contribution corresponding to a fraction of the transmitted signal, and contributions corresponding to background emitters. In order to increase the efficiency to detect the signal within the received contributions one has to preselect what part of the detectable radiation one wants to analyze in an attempt to find the emitted signal.

In Spinhirne U.S. Pat. No. 5,241,315, a bandpass wavelength filter is employed to suppress a large part of the background contributions. Light with a wavelength other than the emitted wavelength clearly doesn't contain the sought-after signal contributions. This allows to discard the large majority of background contributions coming from, say, the sun in the form of daylight.

In Kirschner U.S. Pat. No. 7,809,182, the background contributions is suppressed in the captured image according to a precharacterization. This precharacterization involves to acquire two images: one during the irradiation (positive, or P-image), one without the irradiation (negative, or N-image). In such an approach the two images can for example be subtracted and thus a background suppressed result be obtained. In other words, they use an N-image to calibrate the camera to subtract the expected background from the P-image. In their specific invention they try to infer from the background level present in the N-image to the background contributions present in the P-image. For this the algorithm needs to have a model of the background contribution. If this algorithm ends up using the wrong model, for example a black body radiation instead of another laser, their proposed method may fail to converge to a solution.

Additionally, the method implies that the signal corresponding to the emitted laser is significantly more powerful than the corresponding spectral contribution of the sun. This in turn implies a relatively strong laser, and/or it means that the performance of the method overall is limited by the signal to background ratio (SBR) present in the P-image alone. In the difference of two random variables, the expectation values of the two is subtracted. On the other hand, the variance is additive. If we consider signal and background to be the expectation values of the respective random variables, the SBR can improve by taking into account the two P- and N-images. However, if we take the variance as an indicator of the noise components in the resulting image, the signal to noise ratio (SNR) actually worsens. In many cases this is undesirable.

In Kalshoven et al. U.S. Pat. No. 6,744,470, they try to capture a video of a scene in which a pulsed laser highlights a certain point within said scene. The pulse duration is shorter than a frame duration. They increase the shutter speed of the camera for the frames captured during the time the laser is on (P-frames, in reference to U.S. Pat. No. 7,809,182), compared to the frames without laser light (N-frames). This method has the advantage that still all of the signal is captured (the laser emission) but only a limited amount of background. Consequentially, the P-frames themselves show an improved SBR.

Once we work with a single photon sensitive detector (SPAD, APD, or SiPM) an important background contribution originates not from environmental photons, but from the detector itself in the form of dark current or dark counts. Temperature is an important parameter regarding dark count rate (DCR). Therefore, one way to reduce DCR is to cool down the detector. This is for example highlighted by Bodlovic et al. US20150364635. Such active and external measures typically increase cost and complexity of the end device.

Beside active measures applied during operation, strategies are known to mitigate DCR from a design point of view. In Boisvert et al. US20150340390, for example, they incorporate DCR suppression elements into the sensing substrate. This type of solution brings in design constraints which in some cases cannot be balanced with more fundamental design requirements.

The present invention builds on top of the concepts introduced in prior art, while overcoming several of the highlighted drawbacks and limitations.

Disclosure of the Invention

It is the aim of the present invention to provide a method to arrange a laser emitter and a photo-sensitive detector such that the available optical budget is optimized with respect to eye-safety, the signal to background ratio of the detection, and the power consumption of the detector when working in a remote sensing configuration. It is further the aim of the present invention to provide a device implementing said method.

According to the present invention, the aforementioned aim is achieved with a method for
remote sensing by means of at least one laser emitter and at least one detector, comprising:
  setting a target time unit integration time $t_p$;
  translating said time unit integration time into a reduced time $\tau_p$ and its corresponding power increase factor $\eta^{-1}$;
  activating both the laser emitter, with a power output corrected by $\eta^{-1}$, and the detector for a duration of $\tau_p$;
  deactivating the emitter and detector after duration $\tau_p$;
  keep emitter and detector off for the subsequent duration $t_{off}=t_p-\tau_p$.

Preferably, said target integration time unit results from a target frame rate.

Advantageously, communication is exchanged with an external device during the off-time $t_{off}=t_p-\tau_p$ and said communication updates configurations.

Moreover, the translation of said time unit integration time into a reduced time $\tau_p$ is obtained by means of a look-up-table (LUT) listing pre-calculated values.

The translation of said time unit integration time into a reduced time $\tau_p$ is obtained by calculating it continuously according to the time domain and/or the spectral region.

In another embodiment, the translation of said time unit integration time into a reduced time $\tau_p$ is obtained by providing coarse steps from a look-up-table (LUT) listing pre-calculated values and by calculating interpolated value.

Moreover, it operates in a continuous acquisition mode set up to acquire frames of $t_p$ integration time each in order to obtain a frame rate $1/t_p$.

Moreover, it operates in such a way that it acquires a single acquisition following a trigger signal and then waits for a subsequent trigger signal.

Advantageously, it delays the activation of the laser emitter and photo-sensitive detector by an additional amount of $t_{delay}=\max[(\eta_{preceding}-\eta)t_p, 0]$, with $\eta_{preceding}$ being the inverse of the power increase factor of the preceding acquisition.

Moreover, if the trigger signal arrives during the idle mode duration $t_{off}$, said trigger signal is ignored or delayed until said duration has timed out.

Another object of the invention concerns a device
device for remote sensing by means of at least one laser emitter and at least one detector, comprising at least a laser emitter, a photo-sensitive detector and a logic circuit controlling the laser emitter and the photo-sensitive detector and a computer program product embodied in one or more computer readable medium(s) having computer readable program code embodied thereon executable by a processor to perform actions comprising:
  setting a target time unit integration time $t_p$;
  translating said time unit integration time into a reduced time $\tau_p$ and its corresponding power increase factor $\eta^{-1}$;
  activating both the laser emitter, with a power output corrected by $\eta^{-1}$, and the detector for a duration of $\tau_p$;
  deactivating the emitter and detector after duration $\tau_p$;
  keep emitter and detector off for the subsequent duration $t_{off}=t_p-\tau_p$.

Preferably, said target integration time unit results from a target frame rate.

Advantageously, communication is exchanged with an external device during the off-time $t_{off}=t_p-\tau_p$ and said communication updates configurations.

Moreover, the translation of said time unit integration time into a reduced time $\tau_p$ is obtained by means of a look-up-table (LUT) listing pre-calculated values.

In a first embodiment, the translation of said time unit integration time into a reduced time $\tau_p$ is obtained by calculating it continuously according to the time domain and/or the spectral region.

In another embodiment, the translation of said time unit integration time into a reduced time $\tau_p$ is obtained by providing coarse steps from a look-up-table (LUT) listing pre-calculated values and by calculating interpolated value.

Moreover, it operates in a continuous acquisition mode set up to acquire frames of $t_p$ integration time each in order to obtain a frame rate $1/t_p$.

Preferably, it operates in such a way that it acquire a single acquisition following a trigger signal and then wait for a subsequent trigger signal.

Advantageously, it further comprises means for delaying the activation of the laser emitter and photo-sensitive detector by an additional amount of $t_{delay} = \max[(\eta_{preceding} - \eta)t_p, 0]$, with $\eta_{preceding}$ being the inverse of the power increase factor of the preceding acquisition.

If the trigger signal arrives during the idle mode duration $t_{off}$, said trigger signal is ignored or delayed until said duration has timed out.

It further comprises an external device sending said trigger signal, said external device being a screen, a projector, a computer, or a server.

BRIEF DESCRIPTION OF THE DRAWINGS

The invention will be further elucidated by means of the following description and the appended drawings.

DESCRIPTION OF PREFERRED EMBODIMENTS

Figures 1, 2:
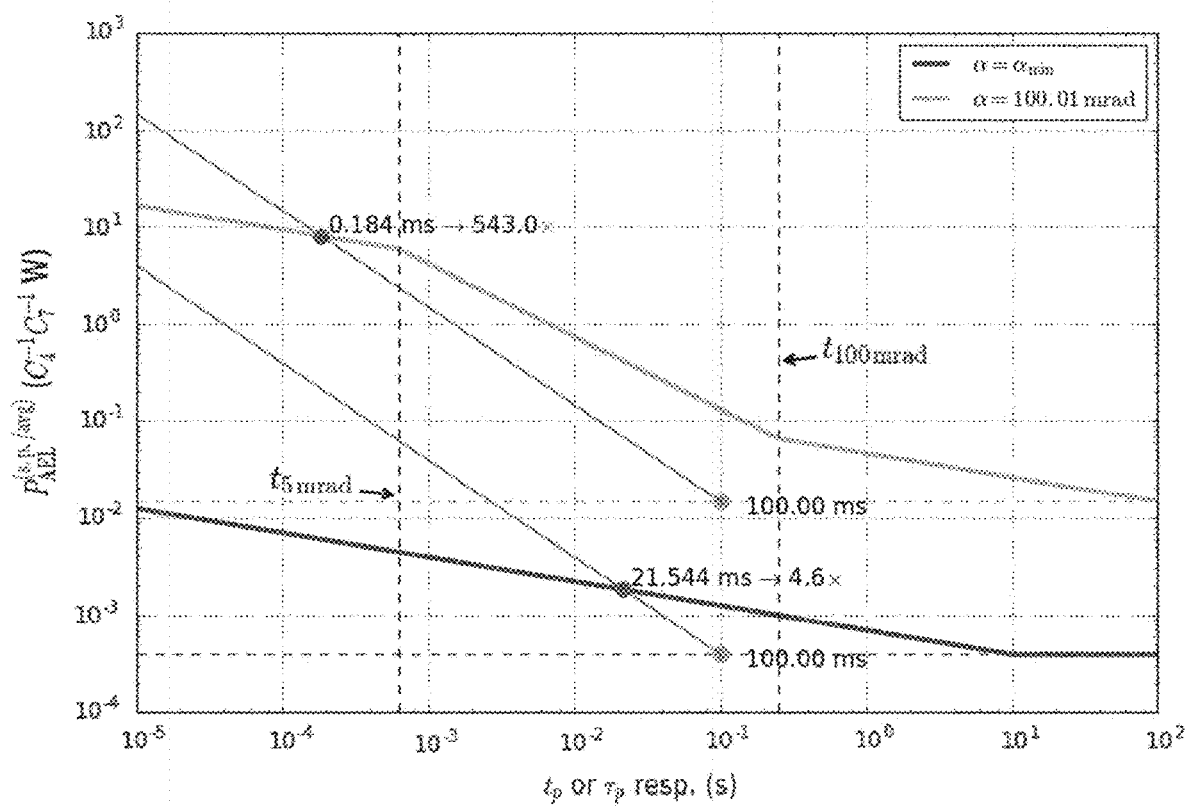
FIG. 1 is a list of equivalent symbol names over different reference documents regarding eye-safety.
FIG. 2 illustrates the presented calculations for the retinal hazard region which can be understood graphically when plotting the allowed emission power limit in a double logarithmic plot.

The present invention will be described with respect to particular embodiments and with reference to certain drawings. The invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In the section listing prior art we have already introduced several eye-safety concepts needed to understand the present invention. Before explaining the preferred embodiments we need to state some concepts in more detail. Again, we stick primarily with the notations used by the international standard IEC 60825-1:2014, "Safety of laser products—Part 1: Equipment classification and requirements," Edition 3, 2014. However, the American National Standard for Safe Use of Lasers, ANSI Z136.1, and the ICNIRP (International Commission on Non-Ionizing Radiation Protection) guidelines on exposure limits published in Health Phys. 105(3), 2013, doi:10.1097/HP.0b013e3182983fd4 are equivalent, as for example explained in B. J. Lund and K. Schulmeister, "On the exposure limits for extended source multiple pulse laser ex-posures," J. of Laser Appl. 25(4), 2013, doi: 10.2351/1.4802761. For convenience, in FIG. 1 we list the differences in symbol notation between these three publications. This way people used to either of the notations can easily follow the present description.

The mentioned regulatory documents state different laser classes. For each laser class there is a defined tabulated accessible emission limit (AEL); if the laser device emits a higher power than this limit corresponding to a certain target laser class, said laser device cannot be certified as this class, and a higher class needs to be considered instead. This AEL is stated as two criteria: the average power criterion and the single pulse energy criterion. These two criteria typically give two different emission limits. The lower of the two limits—hence stating the more restrictive criterion—implies the laser class of the laser device.

To fully understand these two criteria two time scales are important: $T_2$ takes into account involuntary eye-movements relevant for the retinal hazard region, $T_i$ accounts for tissue reaction time. Exposures of durations $t > T_2$ will be irradiated on different sites on the retina. Consequentially, this is the maximum exposure duration one needs to consider to assess pulse trains in the retinal hazard region; see for example R. Henderson and K. Schulmeister, "Laser Safety," IOP Publishing Ltd., 2004. Tissue cannot react faster than $T_i$, the thermal confinement time. Therefore, pulses falling within duration $T_i$ have to be summed together. As a consequence, a pulsed emission with pulse repetition rate (PRR) $f_{PRR} \geq 1/T_i$ is considered (quasi-)continuous wave. Even if the laser emits at a low duty-cycle with pulse durations much shorter than the thermal confinement time $t_p \ll T_i$, from a tissue point of view the emission is not pulsed.

In the following described embodiments, we refer to pulses with pulse durations $t_p > T_i$. However, a person skilled in the art will understand that, given the statement above, these pulses themselves can consist of pulses $t_p \ll T_i$ emitted with a PRR $f_{PRR} \geq 1/T_i$, such that from a tissue point of view the relevant pulse duration is given by $t_p$.

The average power criterion for class 1 laser devices emitting in the retinal hazard region 400 nm<$\lambda \leq$1400 nm reads as (see FIG. 1 regarding correction factors $C_x$)

$$P_{AEL}^{(avg)} = 7 \times 10^{-4} T_2^{-0.25} C_4 C_6 C_7 W. \quad (Eq. 1)$$

The limiting energy for single pulses emitted in the retinal hazard region according to the single pulse criterion for pulses of duration $T_i \leq t_p \leq T_2$ reads as $$Q_{AEL}^{(s.p.)} = 7 \times 10^{-4} t_p^{0.75} C_4 C_5 C_6 C_7 J. \quad (Eq. 2)$$

For triangular or rectangular pulses equation (Eq. 2) can be conveniently rewritten as allowed peak power: peak power P relates to pulse energy Q with pulse duration t as P=Q/t (this is for triangular and rectangular pulses, for a more in-depth discussion see for example R. Henderson and K. Schulmeister, "Laser Safety," IOP Publishing Ltd., 2004). It is therefore, $$P_{AEL}^{(s.p.)} = 7 \times 10^{-4} t_p^{-0.25} C_4 C_5 C_6 C_7 W. \quad (Eq. 3)$$

This representation of the single pulse criterion has the same dimensionality (i.e. power) as the average power criterion (Eq. 1). Working with the same dimensionality facilitates to explain the present invention. Additionally, apart from correction factor $C_5$ the power equations can be written as only one replacing $t_p$ with $\min(t_p, T_2)$. A person skilled in the art should understand that for pulses with a more complex pulse shape than triangular or rectangular the pulse energy is the regulated quantity (as given by (Eq. 2)) and while the disclosed insights still apply, the exact calculation may be more cumbersome.

Correction factor $C_6$ depends on the size of the subtended angle $\alpha$ of the apparent source—and thus image projected onto the retina—and the pulse duration $t_p$. It is $$C_6(\alpha, t_p) = \frac{\min[\max(\alpha, \alpha_{min}), \alpha_{max}(t_p)]}{\alpha_{min}},$$

with $\alpha_{min}$=1.5 mrad, and the time dependent $\alpha_{max}$ given by $$\alpha_{max}(t_p) = \min[\max(5 \text{ mrad}, 200 \sqrt{t_p} \text{ mrad}), 100 \text{ mrad}].$$

Given the definition of $\alpha_{max}$ one can find a characteristic time t $\alpha$ for which $\alpha_{max}(t_\alpha) = \alpha$, see for example in B. J. Lund and K. Schulmeister, "On the exposure limits for extended source multiple pulse laser exposures," J. of Laser Appl. 25(4), 2013, doi:10.2351/1.4802761. This characteristic time is $$t_\alpha = \left( \frac{\min[\max(5 mrad, \alpha), 100 mrad]}{200 mrad} \right)^2.$$

It is thus possible to rewrite correction factor $C_6$ as $$C_6(\alpha, t_p) = \frac{\max(\alpha, \alpha_{min})}{\alpha_{min}} \frac{\max(\alpha, \alpha_{max}(t_p))}{\alpha_{max}(t_p)};$$

for which there is a domain in pulse duration for which $$C_6(\alpha, t_{5mrad} \leq t_p < t_\alpha) = \frac{\alpha^2}{200 \alpha_{min}} t_p^{-\frac{1}{2}}$$

correction factor $C_6$ is not constant but increases for shorter pulse durations.

The formulas to determine the power limits corresponding to the mid and far infrared region $\lambda$>1400 nm differ from those of the retinal hazard region. In order to facilitate the discussion of the mid and far infra-red (MIR and FIR) spectral region, we define a time breakpoint $T_3$ which acts as the equivalent of $T_2$ of the retinal hazard region. This breakpoint does not exist in the cited eye-safety regulations, we include it to write the corresponding equations in a more consistent way. For 1400 nm<$\lambda \leq$1500 nm and 1800 nm$\leq$4000 nm it is $T_3$=0.35 s. For $\lambda \geq$4000 nm it is $T_3$=10 s. In the spectral region between 1500 nm<$\lambda$<1800 nm it is $T_i$=10 s, so that the present invention doesn't apply: a repetitively pulsed emission (with pulses shorter than 10 s) has to be considered as quasi continuous wave, not pulsed. For an emission of this spectral region with pulses of duration $t_p \geq T_i$ it is $$P_{AEL}^{(avg/s.p.)} = 4.4 \times 10^{-3} [\min(t_p, T_3)]^{-0.75} W. \quad (Eq. 4)$$

Up to this point we have not yet introduced a new concept. The stated formulas follow directly from the cited regulation. We have only reformulated the included equations in versions that are slightly more convenient for the discussion to follow.

The limits posed by the average power criterion (Eq. 1) and the single pulse (peak power) criterion (Eq. 3)—and (Eq. 4), respectively—we can interpret as indeed just that, a limit on the allowed emitted power and energy, respectively. Alternatively, we can say the average power criterion tells us how many photons we're allowed to emit per unit time (typically per second)—however, the criterion doesn't say anything about how those photons can be emitted in time. The single pulse criterion tells us how densely in time we're allowed to pack the emitted photons.

We can obtain the value of allowed average power by combining various pulses of different shapes. One way to redistribute this average power is to take the energy emitted during a time unit $t_p$ and to pack it in a pulse of duration $\tau_p = \eta t_p$. A pulse of this $\tau_p$ duration, with an amplitude F=$\eta^{-1}$ higher than the amplitude of the initial pulse, ends up at the same average energy as emitted during the initial unit time.

For example, let's assume we consider a continuous wave (cw) emission and look at $t_p$=100 ms during which we emit a constant $Q_p$=0.1q J. The cw-state means, this pulse-equivalent is emitted with a pulse Q repetition rate (PRR) of $f_{PRR}$=1/(100 ms)=10 Hz. The average power is $P_p = Q_p f_{PRR} = Q_p/t_p$=1q W. We can reduce the pulse duration for example with factor $\eta$=0.1 (i.e. 10 ms) and at the same time increase the peak power by a factor of F=$\eta^{-1}$=10. With these two measures the pulse energy remains (peak) $Q'_p = P_p^{(peak)} \tau_p$ F=$Q_p$=0.1q J. As long as we keep $f_{PRR}$=10 Hz, the average power emitted is the same as before. What has changed, however, is that before we have considered a cw emission, i.e. an emission with 100% duty-cycle. In the redistributed emission we emit the same energy (/power) but in pulsed form. The duty-cycle of this pulsed emission corresponds to $\eta=10\%$. The peak power of such a redistributed pulse scales as (with $P_{AEL}^{(avg)}$ from (Eq. 1))

$$P_{AEL}^{(peak,avg)} = P_{AEL}^{(avg)}/f_{PRR}t_p \propto t_p^{-1}.$$

However, even if we keep the average power constant, we cannot redistribute the emission arbitrarily. According to the single pulse criterion the allowed peak power scales as (from (Eq. 3)) $P_{AEL}^{(s.p.)} \propto t_p^{-0.25}$. Put explicitly, the single pulse peak power scales slower than the average power criterion would allow; $|-0.25|<|-1|$. For the classification of the laser device the more restrictive of the two limits is relevant. This means, we can redistribute the pulse $t_p^{-1}$ as suggested by the average power criterion until the resulting peak power hits the limit posed by the single pulse $t_p^{-0.25}$ criterion.

With $\tau_p^{(crit)}$ we refer to the critical minimum time within which we are allowed to emit the cw equivalent energy of an average power criterion limited emission corresponding to $t_p$. In order to find this critical minimum time we have to consider three time domains, implied by the definition of $t_\alpha$. For each of these time domains we find the limit at the point where the average power criterion limited energy emitted during $t_p$ (it is $Q=P\,t_p$)—which is reduced to $\tau_p$—is equal to the single pulse criterion of duration $\tau_p$. For simplicity we call the pulse resulting from reducing time unit $t_p$ to $\tau_p$—while keeping the integral constant—a "compressed pulse" of duration $\tau_p$, corresponding to the "uncompressed" time unit $t_p$. In this terminology $\tau_p^{(crit)}$ thus refers to the critically compressed pulse duration and $\eta^{-1}$ to the compression factor.

In the following we derive the theory necessary to understand the disclosed embodiments. We look at the spectral regions corresponding to the retinal hazard region 400 nm$<\lambda\leq$1400 nm, and the mid and far infrared (MIR and FIR, respectively) region $\lambda>$1400 nm independently.

For the retinal hazard region, in an initial step we assume $C_5=1$ and thus ignore the presence of this correction factor. This simplification is valid only for $\alpha_{min}\leq\alpha\leq5$ mrad and for $\alpha>100$ mrad. We will address the regime 5 mrad$<\alpha\leq$100 mrad later on, after we have introduced the main concepts of the present invention.

For $t_p>T_2^{1/4}t_\alpha^{3/4}$ (resulting in $\tau_p>t_\alpha$) it is (equating the average power criterion with the single pulse criterion)

$$7\times10^{-4}T_2^{-0.25}t_p\tau_p^{-1} = 7\times10^{-4}\tau_p^{-0.25},$$

$$\Rightarrow T_2^{-0.25}t_p = \tau_p^{0.75},$$

$$\Rightarrow \tau_p = \tau_p^{(crit)} = T_2^{-1/3}t_p^{4/3},$$

with $$\eta^{-1} = T_2^{1/3}t_p^{-1/3}. \qquad \text{(Eq. 5)}$$

For the time domain $T_2^{1/4}t_\alpha^{1/2}t_{5\,mrad}^{1/4}<t_p\leq T_2^{1/4}t_\alpha^{3/4}$ (resulting in $t_{5\,mrad}<\tau_p\leq t_\alpha$) correction factor $C_6$ is not the same for the limit given by the average power criterion as the limit from the single pulse criterion. Together with the definition of $\alpha_{max}$ and $t_\alpha$ stated above it is therefore $$7\times10^{-4}T_2^{-0.25}t_p\tau_p^{-1}\frac{\alpha}{\alpha_{min}} = 7\times10^{-4}\tau_p^{-0.25}\frac{\alpha^2}{\alpha_{min}\alpha_{max}}, \qquad \text{(Eq. 6)}$$

$$\Rightarrow \tau_p = \tau_p^{(crit)} = T_2^{-1}t_\alpha^{-2}t_p^4,$$

with $$\eta^{-1} = T_2 t_\alpha^2 t_p^{-3}.$$

Lastly, for time domain $T_2^{3/4}T_2^{1/4}t_\alpha^{1/2}t_{5\,mrad}^{-1/2}<t_p\leq T_2^{1/4}t_\alpha^{1/2}t_{5\,mrad}^{1/4}$ resulting in $T_i<\tau_p\leq t_{5\,mrad}$) it follows $$\Rightarrow \tau_p^{(crit)} = T_2^{-1/3}t_\alpha^{-2/3}t_{5\,mrad}^{2/3}t_p^{4/3},$$

with $$\eta^{-1} = T_2^{1/3}t_\alpha^{2/3}t_{5\,mrad}^{-2/3}t_p^{-1/3}. \qquad \text{(Eq. 7)}$$

For the MIR and FIR spectral region the cw emission can be compressed analogously. As mentioned above, for 1500 nm$<\lambda<$1800 nm it is $T_i=10$ s so that the emission cannot be compressed. Apart from this region, however, it is, for $T_3^{3/4}T_i^{1/4}\leq t_p\leq T_3$ (resulting in $T_i\leq\tau_p$)

$$4.4\times10^{-3}T_3^{-0.75}t_p\tau_p^{-1} = 4.4\times10^{-3}\tau_p^{-0.75}$$

$$\Rightarrow T_3^{-0.75}t_p = \tau_p^{0.25}$$

$$\Rightarrow \tau_p = \tau_p^{(crit)} = T_3^{-3}t_p^4$$

with $$\eta^{-1} = T_3^3 t_p^{-3}. \qquad \text{(Eq. 8)}$$

Again, in order not to confuse the readers of the present disclosure: time breakpoint $T_3$ does not exist in the cited eye-safety regulation. We have defined this breakpoint in order to be able to write the corresponding equations in a more consistent way; $T_3$ cannot be found in the cited eye-safety regulation.

The above presented equations can be inverted in order to find the uncompressed time unit $t_p$ corresponding to a critically compressed pulse duration $\tau_p^{(crit)}$.

At this point it is important to stress a few points. It is not possible and/or acceptable to increase the emitted laser power beyond the regulatory maximum. The maximum amount of energy—or in other words the maximum number of photons—allowed to emit is given by the average power criterion imposed on a continuously emitting source. It is possible, however, to partition said maximum emission into finite time units of duration $t_p$. It is further possible to emit the energy corresponding to said time unit duration $t_p$ during the shorter time $\tau_p$. This implies a higher peak power during $\tau_p$ with respect to the average power limit imposed on the initial $t_p$. Said increase is given by $\eta^{-1}$ in the above equations. This higher peak power emission still leads to an eye-safe emission configuration if and only if two conditions are met: first, after emitting for $\tau_p$ the laser must be off for the remaining duration $t_{off}=t_p-\tau_p$. This ensures the emitted average power to be constant. Second, the emission duration $\tau_p$ must not be reduced beyond $\tau_p^{(crit)}$, this means it is strictly $\tau_p\geq\tau_p^{(crit)}$. This ensures not to violate the single pulse criterion. The pulse duration could of course still be reduced beyond $\tau_p<\tau_p^{(crit)}$, and also the peak power could still be increased. But said increase in peak power would have to be less than the reduction in pulse duration, thus resulting in a pulse with a smaller integral and thus smaller overall emitted power.

Figure 3:
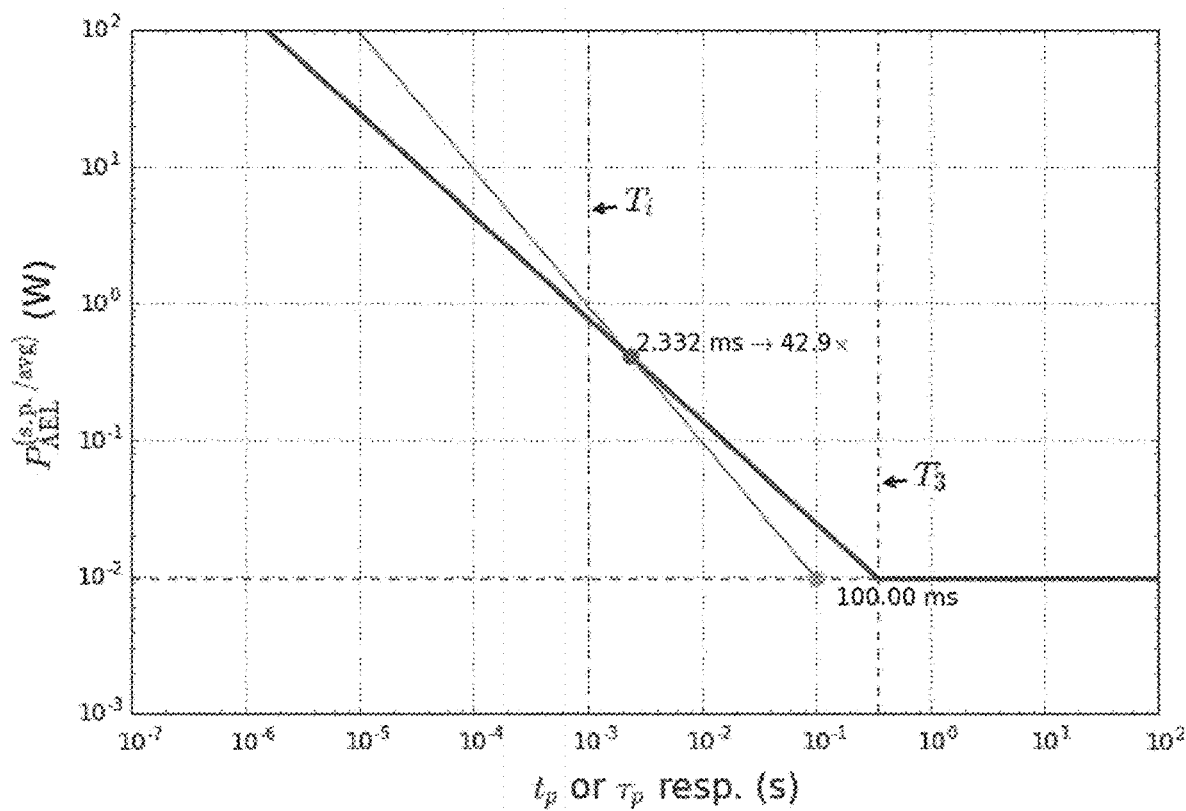
FIG. 3 illustrates the presented calculations for the mid infrared (MIR) region which can be understood graphically when plotting the allowed emission power limit in a double logarithmic plot.

The stated equations may seem non-intuitive at first. In order to more easily understand the equations it is beneficial to plot the power values corresponding to the accessible emission limit (AEL) corresponding to a certain pulse duration in a double logarithmic graph. In FIG. 2 we illustrate two different α configurations as examples for the retinal hazard region. FIG. 3 illustrates the MIR and FIR regions. More precisely, FIG. 3 corresponds only to 2600 nm≤λ≤4000 nm, for which $T_3$ corresponds to the indicated vertical line, and for which region it is $T_i=10^{-7}$ s. For 1400 nm<λ≤1500 nm and 1800 nm≤λ<2600 nm it is $T_i=10^{-3}$ s as indicated by the correspondingly labeled vertical line.

The dashed vertical lines FIG. 2 indicate the three t α related time domains, depending on which one has to work with different formulae. The dashed horizontal lines indicate the limiting average power according to the average power criterion. The solid lines correspond to the single pulse peak power limit. The slope of this solid line is either −¼ or −¾ depending on said time domains. In order to find $\tau_p^{(crit)}$ which corresponds to a certain $t_p$ we can use the showed plot as follows: First, we mark $t_p$ along the dashed horizontal line. In FIG. 2 we have indicated $t_p=100$ ms for both depicted α's. Starting from this marked point we draw a line with slope −1; indicated in red in FIG. 2. This line represents equal average power, if averaged over $t_p$. The point at which this −1 line crosses the line indicating the single pulse peak power limit, corresponds to $\tau_p^{(crit)}$. The ratio between this and the starting point (either in power or time) results in η or $\eta^{-1}$, respectively.

Figure 4:
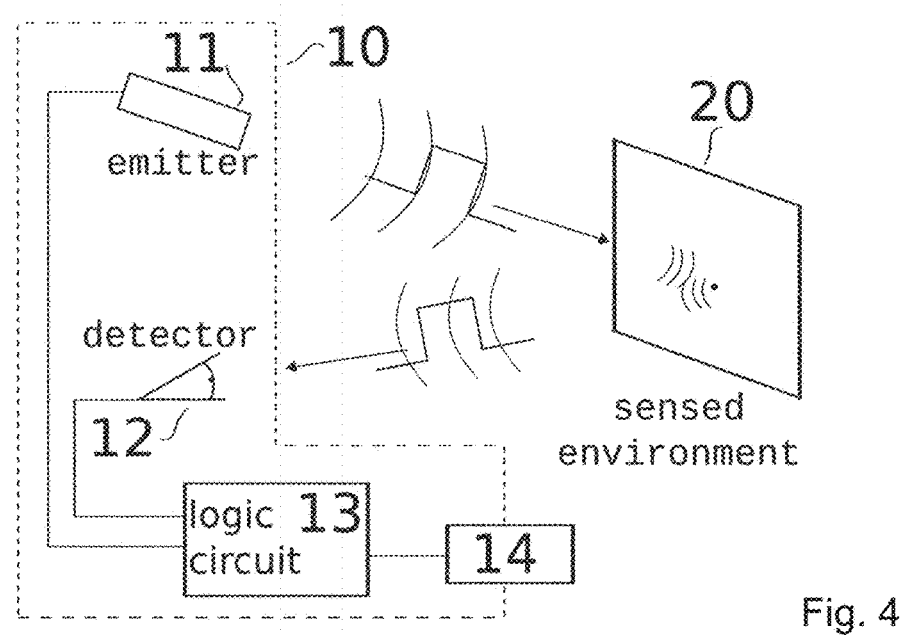
FIG. 4 is a schematic representation of an active remote sensing system according to a disclosed embodiment.

The presented interpretation of the eye-safety regulation together with the thus presented derivations allow us to significantly advance the state of the art regarding remote sensing applications. While the derived equations do not result in an overall increase in allowed total emission power, they provide the basis for using the available power budget in a more efficient way, and on top of that to reduce the power consumption and self-heating on detection side. Accordingly, with reference to FIG. 4 one embodiment of the present invention is an active remote sensing system (10) composed of at least three components: a laser emitter (11), a photo-sensitive detector (12), and a logic circuit (13).

Said laser emitter (11) emits at least one wavelength corresponding to either the retinal hazard region 400 nm<λ≤1400 nm, or the mid or far infrared region 1400 nm<λ≤1500 nm or λ≤1800 nm, respectively. This laser emitter (11) can be any type of laser such as, for example, vertical-cavity surface-emitting lasers (VCSELs), vertical-external-cavity surface-emitting lasers (VECSELs), edge-emitters, gas lasers, fiber laser, and/or dye lasers. The photo-sensitive detector (12) can be, for example, a CCD camera, a CMOS camera, a SPAD-based detector, an APD-based detector, and/or a SiPM-based detector. It should be obvious that the detector (12) has to be adapted for the chosen wavelength of the emitter (11). As such, silicon based detectors (such as CMOS or SiPM) wouldn't work for wavelength about λ>1100 nm, as silicon is transparent in this spectral range. For this spectral range germanium—or other semiconductor compounds such as InSb, InGaAs, HgCdTe, etc.—based detectors could be used, for example. Furthermore, the detector could convert the radiation of one wavelength into radiation of another wavelength, in order to again be able to use, for example, a silicon based detector. Such a conversion device is, for example, disclosed by Ben-Bassat et al. WO2016067275.

The logic circuit (13) controls the emitter (11) and detector (12) according to the present invention. The logic circuit (13) further enables the input and output interface with an external device (14), such as, for example, a screen, a projector, a computer, or a server. The logic circuit (13) could be implemented as for example software running on a central processing unit (CPU) or a graphics processing unit (GPU), or as hardware implemented on a field-programmable gate array (FPGA), or as a dedicated application-specific integrated circuit (ASIC). A microcontroller unit (MCU) could be used as well. The aforementioned external device (14) could also signify another logic circuit of similar characteristics; external thus indicating logic outside the main logic circuit (13) responsible to interface with emitter (11) and detector (12).

In said first embodiment of the present invention the logic circuit (13) first sets a time unit as a target integration time $t_p$. This setting can come for example from an internal configuration file or registry, or from an external device. The logic circuit (13) subsequently translates said time unit integration time $t_p$ into a critical minimum time $\tau_p^{(crit)}$ and its corresponding critical power increase factor $\eta^{-1}$ according to the equations (Eq. 5-8) given above. This translation can be realized by means of, for example, a look-up-table (LUT) listing pre-calculated values, or the logic circuit (13) calculates on the fly, or a mixed approach wherein the LUT provides coarse steps and an interpolated value has to be calculated. The logic circuit (13) induces the laser emission of the emitter (11) whose power output is adjusted according to $\eta^{-1}$. Simultaneously, the logic circuit (13) also activates the detector (12). The laser emitter (11) and the detector (12) stay activated for the duration of $t_{on}=\tau_p^{(crit)}$, after which time the logic circuit (13) causes the two to deactivate. During the on-time $t_{on}$ the detector (12), for example, increases a dedicated counter in the logic circuit (13) indicating the amount of detected light. This counter could be, for example, a digital counter counting the number of photons detected by a SPAD or an SiPM. Alternatively, this counter could be an analog circuit, for example, if the detector (12) consists of CCD elements. Such analog circuits would then typically be connected with a digital counter in the logic circuit (13) through an analog-to-digital converter (ADC).

The logic circuit (13) then enters a safety mode (off-time) for the subsequent duration of $t_{off}=t_p-\tau_p$. During this time the laser isn't allowed to emit light. Once this off-time $t_{off}$ is over, the logic circuit (13) again reactivates laser emitter (11) and detector (12) according to its instructions, which again can come from an internal configuration file or registry, or from an external device. The system can, for example, operate in a continuous acquisition mode set up to acquire frames of $t_p$ integration time each in order to obtain a frame rate of $1/t_p$. Alternatively, the system could also be configured to acquire a single acquisition following a trigger signal originating from an external device, and then wait for a subsequent trigger signal. In the latter example, if the subsequent trigger signal arrives during the idle mode duration $t_{off}$ the system, for example, either ignores the request or delays it until said duration has timed out.

The mentioned embodiment doesn't involve a state which evaluates and/or transfers the detected data. As such this embodiment wouldn't behave as one would typically expect from an active remote sensing system. Consequentially, in a further embodiment the same characteristics are present as in the one above, but additionally, after the laser emitter (11) and detector (12) on-time $t_{on}$, as the two are deactivated, the logic circuit (13) processes the counter according to a foreseen algorithm, copies the result to a buffer, which is configured such that an external device can read out said result. As a person skilled in the art will understand, processing and buffering does not necessarily have to happen in this order and the mentioned order is but a mere example. It could also be thought of that first the raw data are copied into a buffer and said buffer then being processed. Further, it could also be possible to interleave processing and buffering, for example, in order to continuously ameliorate a statistical estimator of a certain parameter. The exact scheme depends on the particular needs of the remote sensing application (10); for example, whether the detector (12) consists of a plurality of pixels and the application intends to read out the light intensity measured per pixel, or whether the system is a time-of-flight (TOF) system with only a singular detector (12) wherein the detection readings have to be interpreted as distance information, such applications imply different requirements. Analogously, the processing and buffering stage could be skipped entirely so that an external device would directly access the aforementioned counters, for example, in applications which don't need to compress the detection results before reading them out. Additionally, the detection results—either processed or not—are stored in a buffer, the read-out of said detection results by an external device, as specified, can overlap in time with the subsequent on-time of laser emitter (11) and detector (12), during which newly acquired detection data are stored in a pre-buffer stage. The purpose of a buffer is to enable such read-out freedom in the first place.

Figure 5:
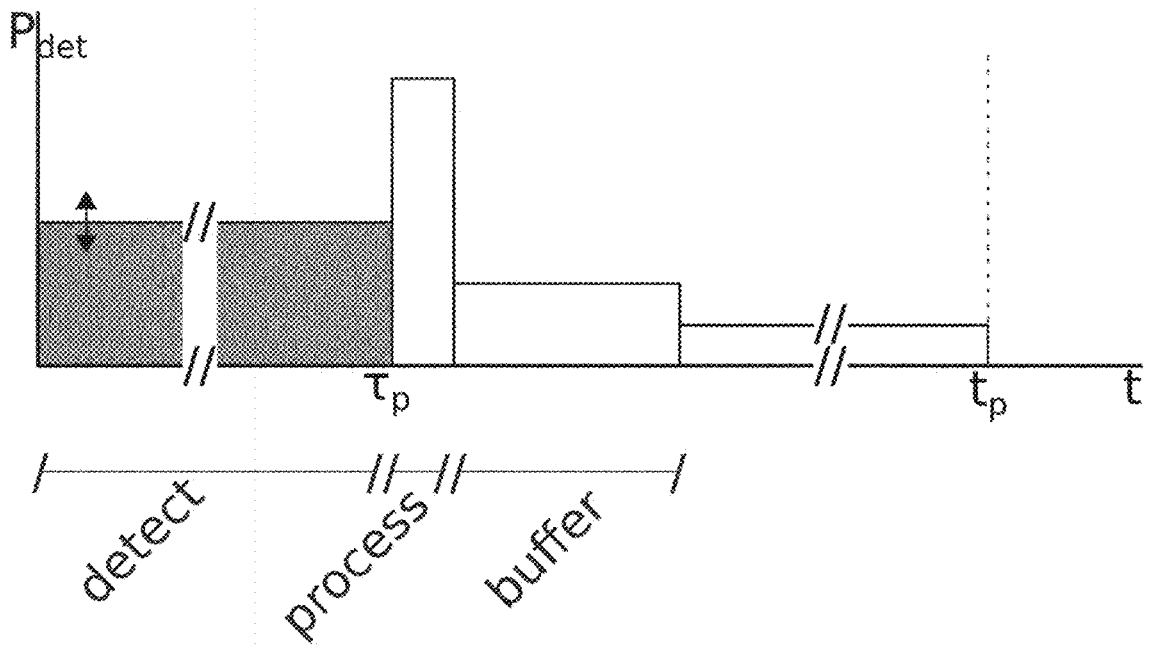
FIG. 5 is an illustration of qualitative power consumption and thus self heating on detection side per sensing cycle of one embodiment.

FIG. 5 illustrates the qualitative power consumption on detection side along the y-axis with respect to the different stages of the mentioned embodiment. This power consumption relates with the induced self-heating in the detector (12) (only during $t_{on}$) and the logic circuit (13). The power consumed during processing typically depends on the processing algorithm implemented. This level can be higher or lower than the level during the detection. The same applies for the buffering time. However, this processing and buffering time $\delta t_{buff}$ is typically significantly shorter than the detection time $t_{on}$—indicated in taupe shading in FIG. 5—or the residual time $t_{off}$-$\delta t_{buff}$. Consequentially, their combined integral both in terms of power consumption as well as in terms of induced self-heating is marginal compared to the integral of corresponding to the detection duration. A schematic depiction of the emitted power corresponding to the mentioned first two embodiments is given in FIG. 6.

The level of power consumption during the detection duration itself depends strongly on the activity rate during this duration. This activity rate depends on the amount of light present in the sensed environment (20) and the thermally induced dark carriers (DCR). The DCR increases with the activity rate: higher activity rate leads to a higher power consumption of the detector (12) in order to handle this activity rate, which means more power has to be dissipated in the form of heat, which increases DCR.

The detected light has two contributions. On the one hand, there is the light the system emits during $t_{on}$. This contribution we refer to as signal. On the other hand, there is the light independently present in the environment. This light could originate, for example, from the sun, or other light sources, such as other lasers. This contribution, together with DCR, we refer to as background.

In a remote sensing application one typically wants to maximize the ratio between signal and background. Increasing the signal would mean to emit more light. However, since we consider to already emit an eye-safety limited amount of power, we cannot further increase the signal. Nonetheless, by reducing the laser on-time from $t_p$ to $\tau_p^{(crit)}$ the aforementioned embodiments are able to maximize the emitted signal density. On the other side, while by simultaneously reducing the sensing time from $t_p$ to the matching $\tau_p^{(crit)}$ the background density does not change—it is outside of our control—its integrated contribution reduces. Namely, this reduction corresponds to the duty-cycle of the emission and detection on-time compared to their off-time, which is given by η. By means of this mechanism the aforementioned embodiments achieve the highest signal to background ratio (SBR) possible independent of the background level.

It should be noted that the idea to reduce the background contributions was already discussed in Kalshoven et al. U.S. Pat. No. 6,744,470. They tried to capture a video of a scene with increased shutter speed, which leads to a reduction in detected background contributions. They, however, didn't try to find an optimum between increasing the shutter speed further (thus reducing t on of the detector (12)) and simultaneously increase the signal contributions (the power of the emission during $t_{on}$). Such an optimum does indeed exist as demonstrated by the above embodiments. Furthermore, by reducing the activity rate as stated, the DCR can be reduced considerably, independent of the thermal management implemented. In particular, the disclosed method can be implemented without the need for DCR suppression elements as, for example, disclosed by Boisvert et al. US20150340390.

It should be also noted that the achievable compression factor $\eta^{-1}$ increases (and hence the duty-cycle η reduces) the shorter the target time unit integration time $t_p$ is. This means, sensing applications which can afford to work with short integration times, tend to particularly benefit from the disclosed embodiments, compared to sensing applications needing long integration times.

Figure 6:
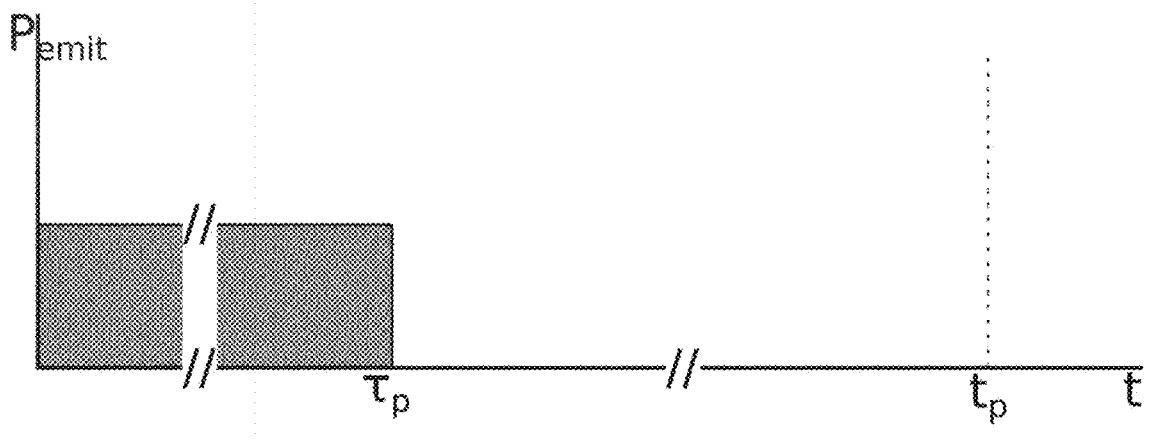
FIG. 6 is an illustration of qualitative power emission per sensing cycle of an embodiment corresponding to a detection profile depicted in FIG. 5.
Figure 7:
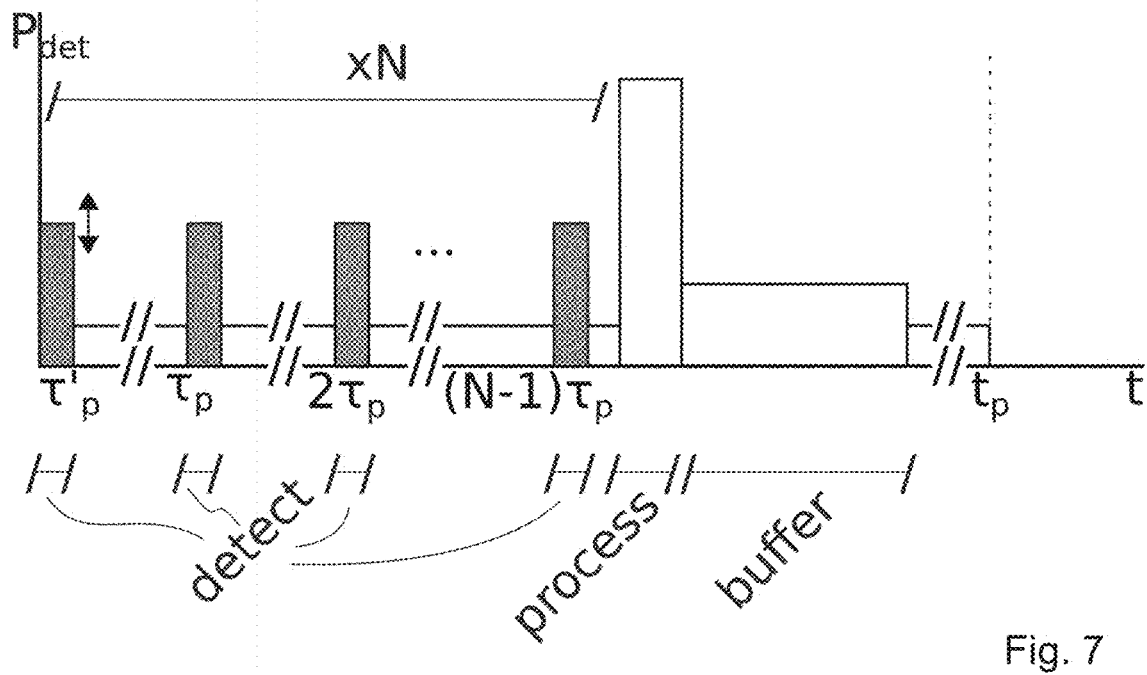
FIG. 7 is an illustration of qualitative power consumption and thus self heating on detection side per sensing cycle of one embodiment according to the present invention.
Figure 8:
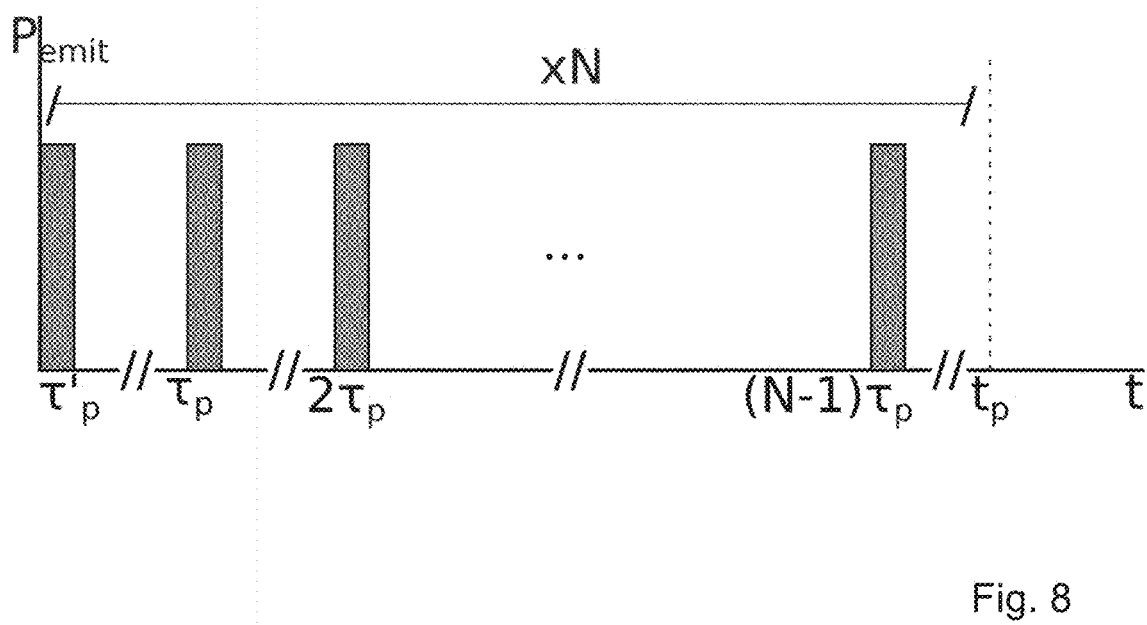
FIG. 8 is Illustration of qualitative power emission per sensing cycle of an embodiment corresponding to a detection profile depicted in FIG. 7.

In another embodiment the logic circuit (13) again translates a set time unit integration time $t_p$ into a critical minimum time $\tau_p^{(crit)}$ and its corresponding critical power increase—or compression—factor $\eta^{-1}$. However, in this embodiment $\tau_p^{(crit)}$ is interpreted as a target time unit integration time $t'_p$ and is once again critically compressed into $\tau_p^{'(crit)}$ along with a $\eta^{'-1}$ calculated. Subsequently, the on-time of emission and detection $t_{on}$ is applied in the form of $N=\eta^{-1}$ pulses of duration $t'_{on}=\tau_p^{'(crit)}$ and with an emission peak amplitude increased by $\eta^{'-1}$. Each of these pulses is followed by off-times of duration $t'_{off}=\tau_p^{(crit)}-\tau_p^{'(crit)}$ during which once again emission and detection are deactivated. The total on-time of this embodiment is shorter than in the case of the previously mentioned embodiments $t_{on}=N$ $t'_{on}=\eta^{-1}\eta'\tau_p^{(crit)}<\tau_p^{(crit)}$, because $\eta^{'-1}>\eta^{-1}$ as mentioned above. Consequentially, the accumulated background contribution, as well as the power consumption of the detection, is smaller than in the previous embodiments. At the same time, the emitted power (and thus the emitted signal) stays constant: there are $N=\eta^{-1}$ pulses each reduced in duration to $\tau_p^{'(crit)}=\eta'\tau_p^{(crit)}$ but at the same time increased in peak power by $\eta^{'-1}$. After the (N−1)-th on-time the logic circuit (13) once again can process and buffer the detection results. As for the previous embodiments, the needed time for this processing and buffering is typically shorter than $t'_{off}$. A qualitative illustration of the typical power consumption on detection side of this embodiment is given in FIG. 7—the different $t'_{on}$ are again indicated in a taupe shading. The qualitative depiction of the corresponding power emission is shown in FIG. 8. According to the present invention, the taupe shaded area in FIGS. 6 and 8 are equal—i.e. the two embodiments emit the same amount of power, thus signal. On the other hand, the shaded areas in FIGS. 5 and 7 are not equal: typically, the background contributions are more important than the contributions corresponding to the signal, so that the shaded area corresponding to the power consumption of the detection logic of the latter embodiment is smaller. Given the present disclosure, it should be evident that the compression and partition of an already compressed pulse makes sense only down to a duration of $\tau_p^{'(crit)}>T_i$.

It should be noted that $\eta^{-1}$ is not necessarily an integer. This is, however, implied by $N=\eta^{-1}$ in the description in the above embodiment, since there have to be an integer number of pulses within $t_p$. In a variant of said embodiment the logic circuit (13) allows only those settings that provide an integer $N=\eta^{-1}$. In yet another variant the logic circuit (13) rounds said number down $N=\text{int}(\eta^{-1})$ to the next integer value. In said latter variant the average emitted power is lower than allowed according to the average power criterion. However, since the background contributions reduce significantly compared to the previous embodiments, this loss in overall signal may be an acceptable trade-off. Further, this rounding error could be seen as a slight safety margin for the laser device to stay below the allowed maximum emission power. Depending on the particular case and risk analysis this may be seen as an advantage, more than a loss.

In a further variant of the aforementioned embodiment, the number of applied pulses is $N=\eta'^{-1}$ and the peak increase factor is only $\eta^{-1}$, with still the duration of the individual pulses being $\tau'_p$. The total average power of the emission is still conserved, as before. The single pulse peak power criterion is also still upheld. In remote sensing applications that rely on statistical processing this embodiment can provide an advantage compared to the previous embodiment because there is a larger number of detection segments available, $\eta'^{-1} > \eta^{-1}$.

In the previously mentioned embodiments it is possible that the system is turned off during $t_{off}$ and back on, still during $t_{off}$. In this case it could be possible that the information about the residual $t_{off}$ is lost, so that the logic circuit (13) assumes the laser is allowed to emit anew. Therefore, in yet another embodiment the logic circuit (13) first applies the off-time of duration $t_{off}$ as a waiting period, before it applies the on-time $t_{on}$. The subsequent processing and buffering of the detection results happen after $t_{on}$, which typically corresponds to $t_{off}$ of the next acquisition, if the system operates in a continuous mode. This embodiment is particularly interesting for example as a variation of aforementioned embodiment corresponding to FIG. 7, in which the light is emitted in $N=\text{int}(\eta^{-1})$ pulses, thus leaving enough time for processing and buffering after the (N-1)-th on-time.

In many cases this embodiment, however, is not the preferred choice. Namely, the detection results can be read out by an external device only with a certain latency compared to the trigger requesting an acquisition. If the trigger signal originates from an external device, this device could anticipate this latency and issue the trigger earlier, in the case the trigger has to be requested in a predictable continuous mode. Alternatively, said external device could delay the synchronization with other devices. Therefore, in another embodiment, the logic circuit (13) again applies first $t_{on}$ during which laser emitter (11) and detector (12) are activated and then $t_{off}$ during which laser emitter (11) and detector (12) are deactivated. For this embodiment, however, the logic circuit (13) utilizes an additional instruction set which results in an initial off-time $t_{off}^{(init)}$ directly after, and only after, boot up. This initial off-time could, for example, correspond to $t_p$, if the system works with only one constant $t_p$ setting. On the other hand, if $t_p$ can change—as for example mentioned in some of the embodiments further below—then $t_{off}^{(init)}$ could correspond to the longest accessible $t_p$.

In the embodiments mentioned thus far we have not addressed the possibility to change the duration of the uncompressed time unit $t_p$ from one acquisition to the next. To introduce this possibility, first, we need to mention again some eye-safety related considerations. Namely, the average power criterion implies that we have to average over varying averaging durations T. Respectively, more than varying durations we have to consider varying averaging windows $[t_0, t_0+T]$. In an emission with only identical pulses, varying the duration and/or the window doesn't change the result, $$P_{avg} = \frac{1}{T} \int_{t_0}^{t_0+T} P(t)dt.$$

If on the other hand we are interested to apply different on-times (and off-times) after another it is important to look at the consequences. As an example we look at a situation given by an emitter (11) emitting in the retinal hazard region and with $\alpha=\alpha_{min}$, without specifying the wavelength further (i.e. we keep $C_4C_7$ in the results). We consider a time unit integration time of $t_{p0}=100$ ms, followed by a time unit integration time of $t_{p1}=316.2$ ms. The emission of the first time unit $t_{p0}$ we can compress into an emission duration of $\tau_{p0}=21.5$ ms, while the emission of the second time unit can be compressed into $\tau_{p1}=100$ ms. The compressed pulse of $\tau_{p0}=21.5$ ms shows a higher peak power than the one during $\tau_{p1}=100$ ms.

Figure 9:
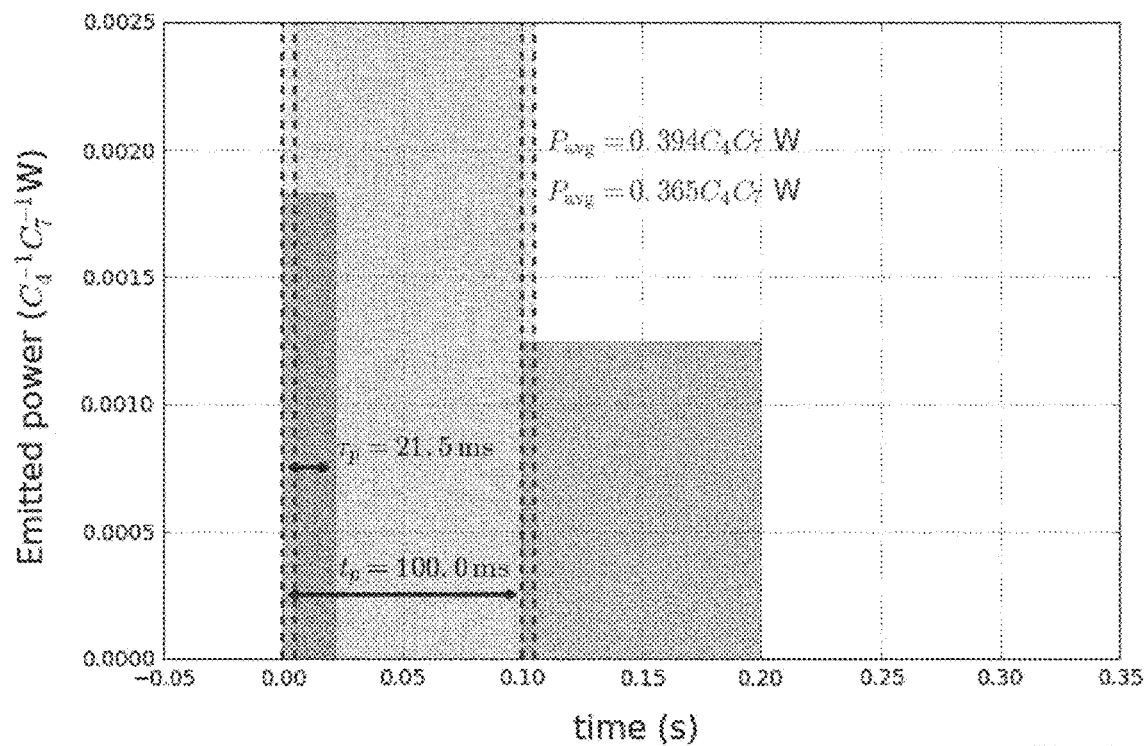
FIG. 9 illustrates the situation of a short compressed time unit followed by a long compressed time unit.

In the above example for $\alpha=\alpha_{min}$ the limiting average power is $P_{AEL}^{(avg)}=0.394C_4C_7$ W according to the aforementioned regulation. In the case the high peak power short time unit is followed by a low peak power long time unit, the average power decreases as we shift the averaging window. This situation is depicted in FIG. 9, the upper indicated power value corresponds to the power limit given by $P_{AEL}^{(avg)}$, whereas the lower value is below the limit. Both values are thus accepted, and the depicted emission conforms with the regulation.

Figure 10:
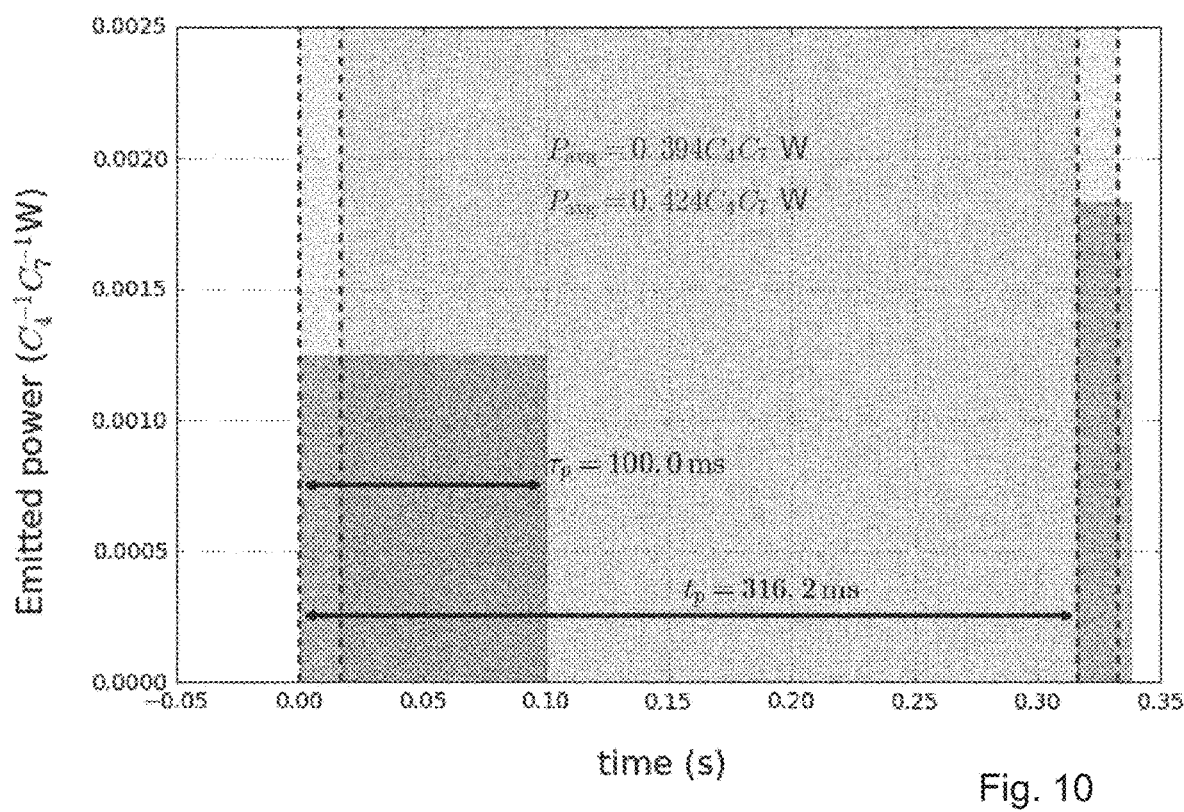
FIG. 10 illustrates the situation of a long compressed time unit followed by a short compressed time unit without correction delay.

If on the other hand we consider a low peak power long time unit followed by a high peak power short time unit the average power does exceed the set limit. Namely, as we shift the averaging window by an infinitesimal amount $\delta t$ from $[t_0, t_0+T]$ to $[t_0+\delta t, t_0+\delta t+T]$ the peak contribution of the second pulse during the shifted $\delta t$ is higher than what gets out of the window of the low peak pulse. This is visualized in FIG. 10 with the position of $\tau_{p0}$ and $\tau_{p1}$ swapped; the upper indicated power value corresponds again to the average power limit, whereas the lower value exceeds this limit. The depicted emission thus does not conform with the regulation.

In summary, if we have varying time units, there is no problem to go from $t_{p0} < t_{p1} < \ldots < t_{pn}$. The peak of the following pulse is lower than the peak of the preceding one, as we shift the averaging window by $\delta t$. More power is freed up by the exiting short pulse than comes in with the entering long pulse. The other way around doesn't work. If a low peak long time unit is followed by a high peak short time unit, the additional power contribution within $\delta t$ lets the average power to exceed the limit. We have to wait for an extra amount of time if we want to change from $t_{p0}$ to $t_{p1}$ with $t_{p0} > t_{p1}$.

The amount of photons that are allowed to be emitted within $t_p$ is limited by the average power criterion. We compress these photons into a pulse of duration $\tau_p$. After emitting this pulse we have to wait the remaining $t_{off}=t_p-\tau_p$ before we're again allowed to emit. If then we want to emit with a higher peak power than during $\tau_p$, we have to wait said extra amount of time. This means the extra amount of time is such that the additional power (/energy) added during $\delta t$ is not more than the budget that is freed up as we leave $\delta t$ of the preceding time unit.

In other words we look for time $t_{delay,k+1}$ at which the energy of the preceding time unit integration time $t_{pk}$ matches the energy of the subsequent one. During the time $\tau_{pk+1}$ the integrated power of the subsequent high peak power pulse during $\delta t$ is larger than the integrated power of the preceding pulse during the same shift $\delta t$. Respectively, given a low peak power long duration pulse followed by a high peak power short duration pulse, $t_{delay,k+1}$ corresponds to only the time during which the first low peak power pulse emits the energy corresponding to the excess given by the high peak power of the second pulse. It is therefore, $$Q_{t_{p_{k+1}}} = \int_0^{\tau_{p_{k+1}}+t_{delay_{k+1}}} P_{t_{p_k}} dt =$$

$$P_{t_{p_k}}(\tau_{p_{k+1}} + t_{delay_{k+1}}) \Rightarrow t_{delay_{k+1}} = \frac{Q_{t_{p_{k+1}}}}{P_{t_{p_k}}} - \tau_{p_{k+1}} =$$

$$\frac{P_{t_{p_{k+1}}}\tau_{p_{k+1}}}{P_{t_{p_k}}} - \tau_{p_{k+1}} = \frac{P_0\eta_{k+1}^{-1}\tau_{p_{k+1}}}{P_0\eta_k^{-1}} - \tau_{p_{k+1}} = (\eta_k - \eta_{k+1})t_{p_{k+1}}.$$

With $P_0$ we denoted the baseline power corresponding to the targeted average power which is adjusted by $\eta^{-1}$ to obtain higher peak power pulses. Again, this calculation only makes sense under the assumption $t_{pk} > t_{pk+1}$, with $Qt_{pk} > Qt_{pk+1}$ and $Pt_{pk} < Pt_{pk+1}$ (and hence $\eta_k > \eta_{k+1}$), otherwise we would have to integrate over more than one pulse to equal $Qt_{pk+1}$; or $t_{delay,k+1}$ would end up negative, respectively.

Figure 11:
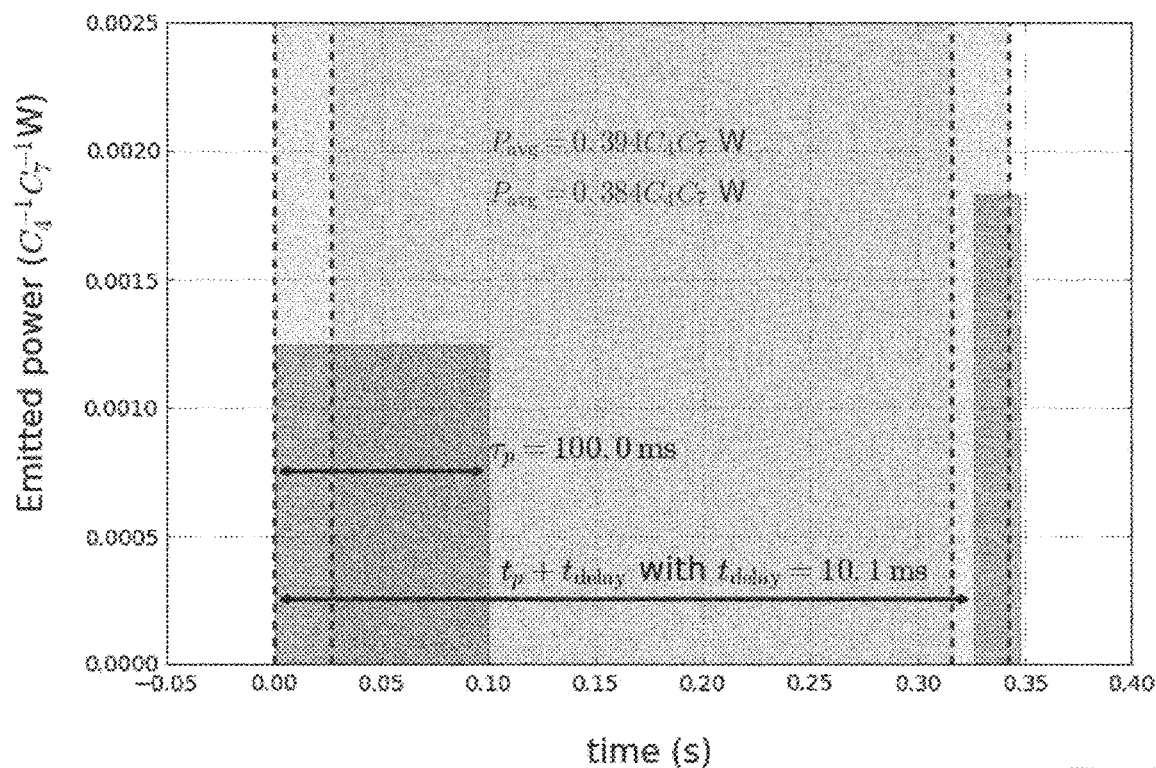
FIG. 11 illustrates the situation of a long compressed time unit followed by a short compressed time unit with correction delay, FIG. 12 visualizes the presented calculations for medium sized sources.

To illustrate this result we reuse the numbers already presented above for the example in the retinal hazard region, but this time we swap $t_{p0}$ with $t_{p1}$. This means we consider $t_{p0}$=316.2 ms (resulting in $\tau_{p0}$=100 ms) and $t_{p1}$=100 ms (resulting in $\tau_{p1}$=21.5 ms). The required delay thus results in $t_{delay}$=10.1 ms. This example is illustrated in FIG. 11.

Correspondingly, in another embodiment of the present invention the logic circuit (13) first sets, as in the previous embodiments, a target time unit integration time $t_{pk+1}$. The logic circuit (13) subsequently translates this $t_{pk+1}$ into a critically compressed pulse duration $\tau_{pk+1}$, along with its corresponding critical power increase factor $\eta_{k+1}^{-1}$, and a necessary delay $t_{delay,k+1}$ by considering the previously used integration time $t_{pk}$ or $\eta_k$, respectively. In order to calculate the very first $t_{delay,1}$ for the correspondingly first on-time after boot up, the logic circuit (13) uses the largest accessible value for $t_{p0}$ or smallest $\eta_0$, respectively.

In order to derive the equations for the compressed pulse durations for the retinal hazard region we have simplified correction factor $C_5$=1, which we have stated is valid as such only for $\alpha_{min} \le \alpha \le 5$ mrad and for $\alpha > 100$ mrad. In the following, we address the range 5 mrad$\le \alpha \le$100 mrad for which $C_5 \ne 1$ in most cases. Correction factor $C_5$ accounts for the exposure to multiple pulses. Namely, if the emission generates N pulses within time $T_2$, it is $C_5$=$N^{-1/4}$. This correction factor has to be multiplied with the single pulse limit in order to obtain the limit per pulse in the emitted pulse train. Correction factor $C_5$ applies only to pulses equal to or shorter than 0.25 s, which happens also to be equal to $t_{100\ mrad}$. Depending on the size of the apparent source a this correction doesn't reduce lower than $C_5$=0.4 or $C_5$=0.2, respectively. With $\alpha_{max}$ being time dependent (see above), B. J. Lund and K. Schulmeister, "On the exposure limits for extended source multiple pulse laser exposures," J. of Laser Appl. 25(4), 2013, doi:10.2351/1.4802761 have demonstrated that the $C_5$ correction factor can be written as a function of pulse duration rather than $\alpha$. Namely, for pulses of duration $\tau_p$ it is for $t_\alpha \le \tau_p \le 0.25$ s: $C_5$=max($N^{-1/4}$, 0.4); and for $T_i < \tau_p < t_\alpha$: $C_5$=max($N^{-1/4}$, 0.2).

To illustrate the consequences of this correction factor let us assume the following example. We work with $\alpha$=100 mrad and we want to divide an average power limited continuous wave (cw) emission into time units of duration $t_p$=100 ms. These $t_p$ we want to compress into $\tau_p^{(crit)}$ as described above. In other words, we start with a cw emission and turn it into a pulsed emission with pulse repetition rate (PRR) $f_{PRR}$=10 Hz. For $\alpha$=100 mrad it is $T_2$=100 s. Therefore, there are going to be N=1000 pulses within $T_2$. With $t_\alpha = t_{100\ mrad}$=0.25 s we thus find $C_5$=0.2. Consequentially, the peak power of the emitted pulses has to be reduced by this factor.

In general, in order to calculate $C_5$ we need to know the number of pulses N emitted within $T_2$. This number is given by the pulse repetition rate (PRR) times $T_2$. The PRR results from the intention that we want to emit the same amount of light as an average power limited cw laser: we split this cw emission into time units of duration $t_p$ and emit the corresponding light in the form of pulses of duration $\tau_p$. However, a subsequent pulse we're allowed to emit only after $t_p$. Assuming non-changing $t_p$ the PRR thus follows as $f_{PRR}$=1/$t_p$. For embodiments such as illustrated in FIGS. 7 and 8 the resulting PRR would be higher correspondingly.

Figure 12:
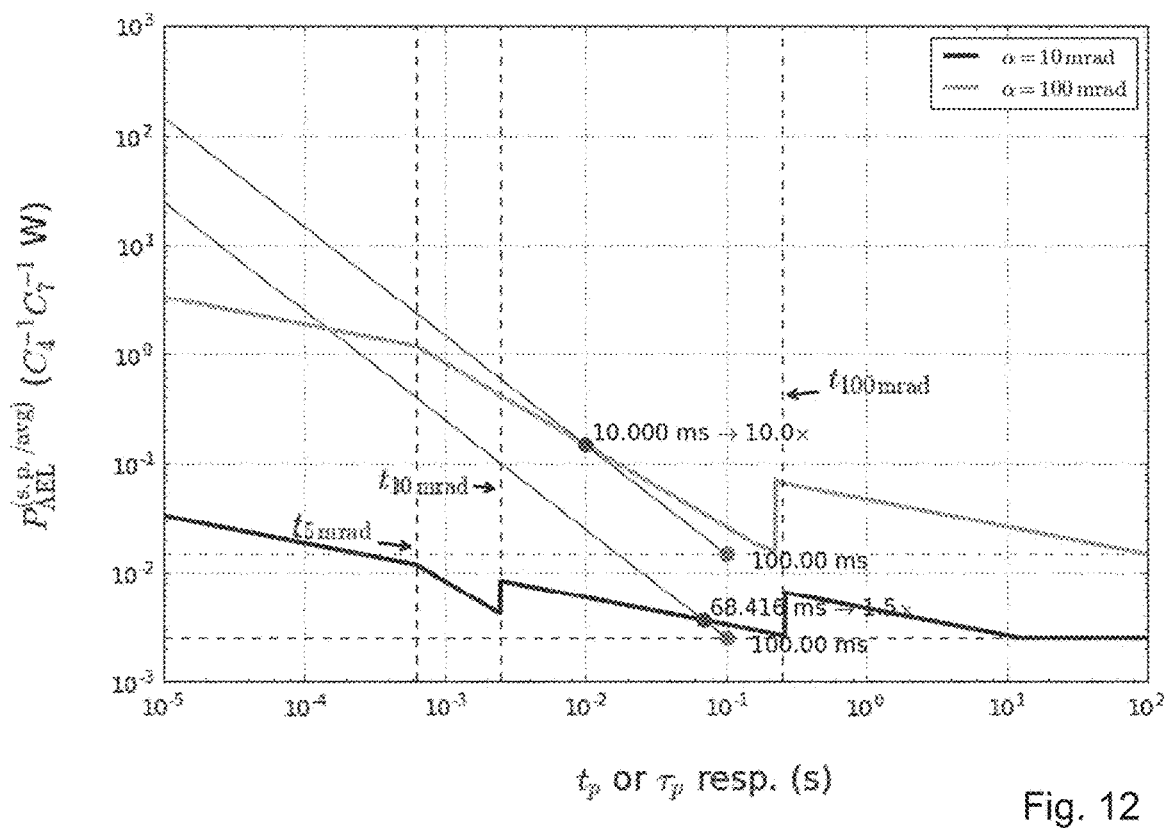

Referring to FIG. 2 this means the solid lines indicating the peak power limit have to be linear translated by 1/0.4=5/2 and 1/0.2=5 units (because we consider a plot in double logarithmic scale) within $t_\alpha < t_p < 0.25$ s and $t_p \le t_\alpha$, respectively. FIG. 12 shows two examples for $\alpha$=100 mrad, for which $C_5$=0.4 never applies, and $\alpha$=10 mrad, which shows the different $C_5$ domains. In order to incorporate $C_5$ in the above derived equations for $\tau_p$ we can replace $T_2$ in said equations with $T'_2 = C_5^4 T_2$, with $C_5$={0.4, 0.2} corresponding to whether $t_p > t_\alpha$ or $t_p \le t_\alpha$, as described. Using these correspondingly corrected equations allows also medium sized sources 5 mrad<$\alpha \le$100 mrad to benefit from the disclosed invention.

For the MIR and FIR spectral regions the above disclosed embodiments apply correspondingly, i.e. there is only one time domain to consider (between $T_i$ and $T_3$) and there are no correction factors $C_x$ to keep track of. However, one particularity of the present invention regarding this spectral region is worth mentioning explicitly. The region 1500 nm<$\lambda$<1800 nm allows the peak power of a single pulse to be one order of magnitude higher than in the region 1400 nm<$\lambda \le$1500 nm and 1800 nm$\le \lambda \le$2600 nm. For this reason the region 1500 nm<$\lambda$<1800 nm is often referred to as the "eye-safe" region, and is, for example, exploited as such in Mayor et al. U.S. Pat. No. 7,583,364. However, since $T_i$ is very long for this region, the summed amount of energy emitted in multiple pulses within $T_i$ has to be below the regulated limit. Given the present invention, on the other hand, and in particular the pulse compression highlighted in FIG. 3, the spectral regions 1400<$\lambda \le$1500 nm and 1800 nm$\le \lambda \le$2600 nm become more attractive for remote sensing applications. This spectral region is further interesting as the atmospheric absorption is particularly pronounced in this region: the background contributions originating from the sun are significantly lower than within the "eye-safe" region. This fact helps to reduce the activity rate on detection side to a minimum, which again positively affects the power consumption and self-heating on detection side.

The embodiments of the present disclosure are not required to operate with class 1 lasers. The disclosed methods in order to compress the emission of a certain time unit $t_p$ into a shorter $\tau_p$ is also beneficial if the baseline of the to be compressed power is higher than the allowed emission level corresponding to class 1 lasers. The disclosed method to optimize the emitted signal density—and thus the detected signal to background ratio—is generally valid as eye-safety concerns are involved. As a person skilled in the art will know, a class 1 laser is not necessarily safe, nor is a safe laser necessarily class 1. Namely, higher class lasers typically have nominal ocular hazard distance (NOHD). For distances within this NOHD the induced exposure is above the maximally permitted exposure (MPE) for eye-safe operation. Outside this NOHD radius, on the other hand, the laser can be considered safe. The MPE values scale in accordance with the AEL values discussed in the present disclosure. In some situations such a high class laser is operated in a way that the device itself is inaccessible for humans. This could be for example a divergent laser mounted on a lamp post, or on a high wall, or on the ceiling of a factory, whereas the power density at the ground would be below the MPE. According to the cited laser safety regulations a laser device can be assigned only one laser class, irrespective of its use. In the stated situations a chosen acceptable NOHD defines the acceptable emission power budget. If this power budget is emitted in short pulses shorter than $\tau\ p(crit)$ according to the present invention, the NOHD would increase, thus potentially leading to an unsafe operation. On the other hand, by maximizing the signal density of said given emission power budget with the methods disclosed in the above embodiments the NOHD of such high class laser devices would not move, while the SBR would improve as mentioned. Consequentially, the present invention is also attractive for such high class laser devices.

In order to explain some of the embodiments corresponding to the present invention we have stated values taken for the cited eye-safety regulation; such as the limits given by $\alpha=5$ mrad for extended sources in the retinal hazard region, or $T_3$, or the spectral regions delimited by e.g. 1400 nm<$\lambda$≤1500 nm, etc. It is possible that future editions of the cited eye-safety regulation changes the numerical values of these size, time, and/or wavelength breakpoints. The explanations given in the present disclosure should enable a person skilled in the art to adapt the stated limits, which is still within the spirit of the present invention.

It will be understood by those skilled in the art that the present invention is not limited to the embodiments illustrated above and that many modifications and additions may be made without departing from the scope of the invention as defined in the appending claims.

The invention claimed is:

1. A method for remote sensing by at least one laser emitter and at least one detector, comprising:
   providing a laser emitter having a laser class and a nominal ocular hazard distance (NOHD);
   setting a target time unit integration time $t_p$;
   translating said time unit integration time into a reduced time $\tau_p$ and its corresponding power increase factor $\eta^{-1}$, and so that the energy of the resulting pulse of duration $\tau_p=\eta*t_p$ remains below the acceptable eye-safe emission power of said laser emitter at said NOHD without increasing the NOHD;
   activating both the laser emitter, with a power output corrected by $\eta^{-1}$, and the detector for a duration of $\tau_p$;
   deactivating the emitter and detector after duration $\tau_p$; and
   keep emitter and detector off for the subsequent duration $t_{off}=t_p-\tau_p$.

2. The method according to claim 1, in which said target integration time unit results from a target frame rate.

3. The method according to claim 1, wherein during the off-time $t_{off}=t_p-\tau_p$ communication is exchanged with an external device.

4. The method according to claim 3, wherein said communication updates configurations.

5. The method according to claim 1, wherein the translation of said time unit integration time into a reduced time $\tau_p$ is obtained by a look-up-table (LUT) listing pre-calculated values.

6. The method according to claim 1, wherein the translation of said time unit integration time into a reduced time $\tau_p$ is obtained by calculating the translation continuously according to the time domain and/or the spectral region.

7. The method according to claim 1, wherein the translation of said time unit integration time into a reduced time $\tau_p$ is obtained by providing coarse steps from a look-up-table (LUT) listing pre-calculated values and by calculating interpolated value.

8. The method according to claim 1, further comprising operating in a continuous acquisition mode set up to acquire frames of $t_p$ integration time each in order to obtain a frame rate $1/t_p$.

9. The method according to claim 1, further comprising operating in such a way to acquire a single acquisition following a trigger signal and then wait for a subsequent trigger signal.

10. The method according to claim 1, further comprising delaying the activation of the laser emitter and photo-sensitive detector by an additional amount of $t_{delay}=\max[(\eta_{preceding}-\eta)t_p, 0]$, with $\eta_{preceding}$ being the inverse of the power increase factor of the preceding acquisition.

11. The method according to claim 9, wherein, if the trigger signal arrives during the idle mode duration $t_{off}$, said trigger signal is ignored or delayed until said duration has timed out.

12. A device for remote sensing by at least one laser emitter and at least one detector, comprising at least a laser emitter having a laser class and a nominal ocular hazard distance (NOHD), a photo-sensitive detector and a logic circuit controlling the laser emitter and the photo-sensitive detector and a computer program product embodied in one or more computer readable medium(s) having computer readable program code embodied thereon executable by a processor to perform actions comprising:
   setting a target time unit integration time $t_p$;
   translating said time unit integration time into a reduced time $\tau_p$ and its corresponding power increase factor $\eta^{-1}$, and so that the energy of the resulting pulse of duration $\tau_p=\eta*t_p$ remains below the acceptable eye-safe emission power of said single laser emitter at said NOHD without increasing the NOHD;
   activating both the laser emitter, with a power output corrected by $\eta^{-1}$, and the detector for a duration of $\tau_p$;
   deactivating the emitter and detector after duration $\tau_p$; and
   keep emitter and detector off for the subsequent duration $t_{off}=t_p-\tau_p$.

13. A device according to claim 12 wherein said target integration time unit results from a target frame rate.

14. A device according to claim 12 wherein during the off-time $t_{off}=t_p-\tau_p$ communication is exchanged with an external device.

15. A device according to claim 14 wherein said communication updates configurations.

16. A device according to claim 12 wherein the translation of said time unit integration time into a reduced time $\tau_p$ is obtained by means of a look-up-table (LUT) listing pre-calculated values.

17. A device according to claim 12 wherein the translation of said time unit integration time into a reduced time $\tau_p$ is obtained by calculating it continuously according to the time domain and/or the spectral region.

18. A device according to claim 12 wherein the translation of said time unit integration time into a reduced time $\tau_p$ is obtained by providing coarse steps from a look-up-table (LUT) listing pre-calculated values and by calculating interpolated value.

19. A device according to claim 12 wherein the device is configured to operate in a continuous acquisition mode set up to acquire frames of $t_p$ integration time each in order to obtain a frame rate $1/t_p$.

20. A device according to claim 12 wherein the device is configured to operate in such a way that the device acquires a single acquisition following a trigger signal and then wait for a subsequent trigger signal.

21. A device according to claim 12 further comprising means for delaying the activation of the laser emitter and photo-sensitive detector by an additional amount of $t_{delay} = \max[(\eta_{preceding} - \eta)t_p, 0]$, with $\eta_{preceding}$ being the inverse of the power increase factor of the preceding acquisition.

22. A device according to claim 20 wherein, if the trigger signal arrives during the idle mode duration $t_{off}$, said trigger signal is ignored or delayed until said duration has timed out.

23. A device according to claim 20 further comprising an external device (14) sending said trigger signal.

24. A device according to claim 23 wherein said external device is a screen, a projector, a computer, or a server.

* * * * *